United States Patent [19]

Angner et al.

[11] 4,039,763
[45] Aug. 2, 1977

[54] KEY TELEPHONE COMMUNICATION PATH INTERFACE

[75] Inventors: Ronald Joseph Angner, Freehold; James Volney Lacy, Red Bank, both of N.J.

[73] Assignee: Bell Telephone Laboratories, Incorporated, Murray Hill, N.J.

[21] Appl. No.: 709,421

[22] Filed: July 28, 1976

[51] Int. Cl.$^2$ .............................................. H04M 1/72
[52] U.S. Cl. ..................................................... 179/99
[58] Field of Search ............................. 179/18 FA, 99

[56] References Cited

U.S. PATENT DOCUMENTS

| | | | |
|---|---|---|---|
| 3,816,670 | 6/1974 | Marshall | 179/99 |
| 3,856,994 | 12/1974 | Ozechoski | 179/99 |
| 3,895,192 | 7/1975 | Angner et al. | 179/99 |
| 3,925,625 | 12/1975 | Angner et al. | 179/99 |
| 3,946,146 | 3/1976 | Brown et al. | 179/99 |

*Primary Examiner*—Kathleen H. Claffy
*Assistant Examiner*—Randall P. Myers
*Attorney, Agent, or Firm*—David H. Tannenbaum

[57] ABSTRACT

There is disclosed an electronic key telephone line circuit having a communication path interface capable of being connected across the communication pair during both the busy and idle conditions of the line circuit. The circuit is arranged such that both the pre-ring test and the impedance test from the central switching machine are satisfied while at the same time presenting a linear impedance for communication signals. Opto isolators are used and coupled with lightning surge protection and a capacitance and resistance bridge to allow permanent connection across the communication pairs. The circuit includes a hold bridge impedance, separate from the signal detection circuitry, switchable across the communication path.

9 Claims, 1 Drawing Figure

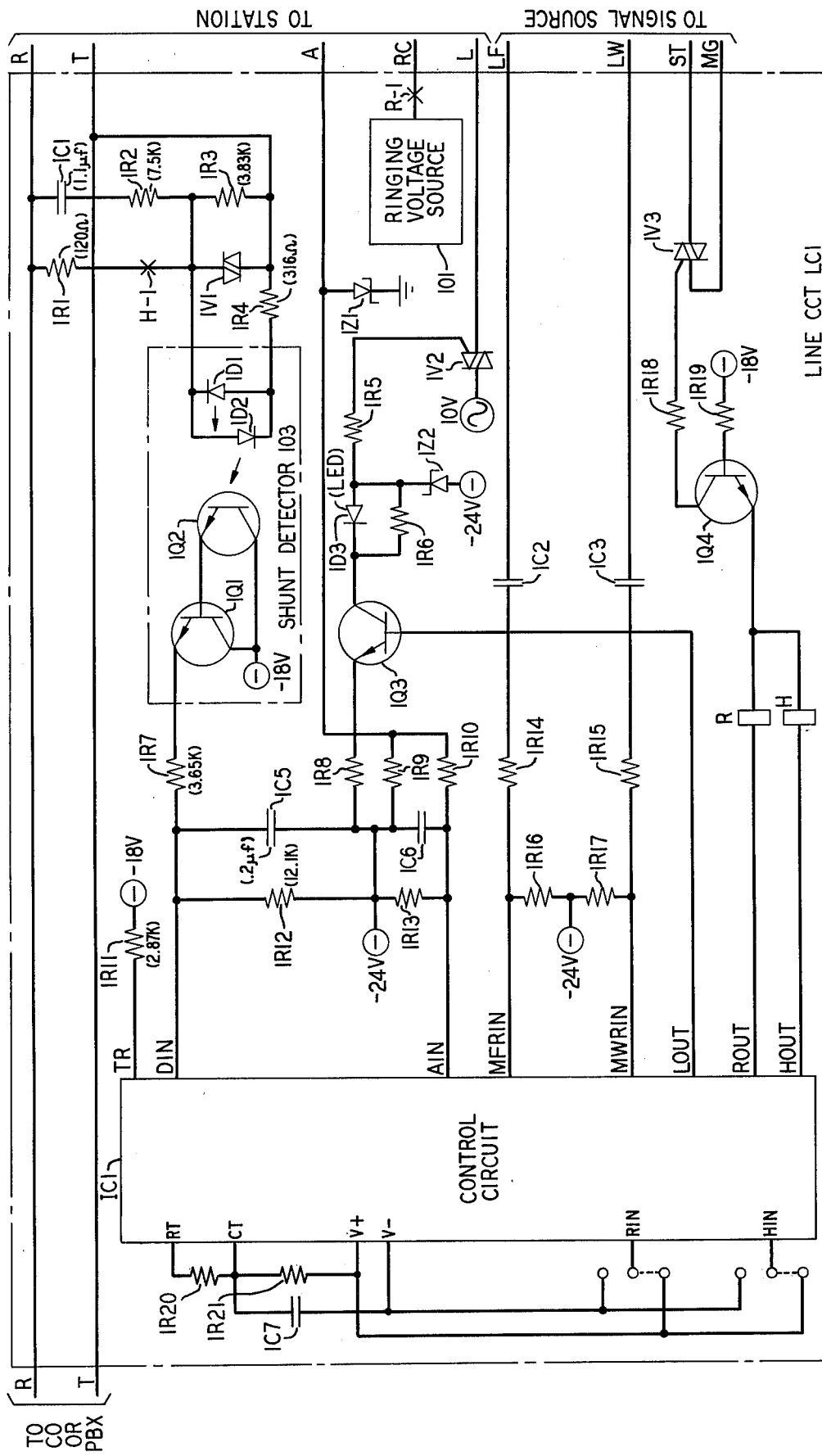

KEY TELEPHONE COMMUNICATION PATH INTERFACE

FIELD OF THE INVENTION

This invention relates generally to an improved key telephone line circuit, and, more particularly, to a key telephone line circuit interface for use in parallel across the communication leads.

BACKGROUND OF THE INVENTION

In U.S. Pat. No. 3,925,625 issued Dec. 9, 1975 to R. J. Angner et al, there is disclosed a key telephone line circuit which is connected in shunt across the top and ring lead communication path between the central switching machine and the subscriber's station to control the HOLD, BUSY and IDLE conditions of the station and to provide the necessary visual and audible signaling to the stations. The line circuit disclosed in the above-identified patent operates to detect ac current flowing for ringing control, while also detecting the transient response of the system for hold and disconnect control. The transient signals are generated upon on-hook to off-hook or off-hook to on-hook circuit transitions.

Shunt control has several advantages, but the most important one is the perfect balance of the tip and ring circuitry at all times. Other advantages include the ease of application of music and tone on hold signals and the fact that the circuit can be removed for maintenance in any state but HOLD or RING without disrupting customer service. The shunt principle of HOLD/DISCONNECT detection is as follows: When a key station goes on-hook, two things happen sequentially:

1. the tip and ring is disconnected at the telephone set which causes a transient signal on the communication pair, and 2. the A-lead is broken. When a line is placed on HOLD, the A-lead is broken before the tip and ring are diconnected at the telephone set. Thus, the HOLD/DISCONNECT distinction is made by detecting the presence of current flow (transient signal) before the A-lead is broken.

The shunt line circuit must also operate to detect ringing and to provide a hold impedance across the communication pair when the line circuit is in the HOLD mode. Implicit in the ability of the line circuit to detect ringing signals is the ability to distinguish such signals from noise, TOUCH-TONE signals, dial pulses, or other unknown signal disturbances which periodically appear on telephone lines.

Since, using the shunt principle, the line circuit impedance is always across the communication line in the IDLE, RING or BUSY modes there are a number of constraints that must be met in order for the line circuit to function properly. In the IDLE state the communication lead interface must not interfere with tests which are made by the Central Office (CO) or PBX. Such tests are routinely made to insure that at least one telephone ringer, and hence at least one telephone station, is connected to the line. Other tests are made to insure the proper insulation of the line. In the BUSY state care must be exercised to insure that the interface does not distort the signaling between the telephone station and the central switching machine and does not adversely affect the voice transmission over the communication pair.

Accordingly, it is an object of our invention to provide a key telephone line circuit having a communication path interface circuit capable of permanent connection across the communication path and capable of satisfying the precommunication period restraints as well as the communication period restraints.

It is a further object of our invention to provide a shunt line circuit without using inductive elements in the interface path while at the same time meeting the central switching machine precommunication period ringer test.

It is a further object of our invention to provide a key telephone line circuit capable of permanent connection to the communication lead pairs during the IDLE, BUSY, RING, and HOLD modes of the line circuit and capable of controlling ringing signal detection and hold abandon detection under divergent line parameters.

SUMMARY OF THE INVENTION

These and other objects are achieved by arranging the communication path interface in a manner to be both frequency and amplitude dependent and generally nonlinear. A varistor is used, coupled with Light Emitting Diodes (LEDs), to provide an impedance which consists essentially of a series combination of resistance and capacitance at low amplitude signals. As the amplitude increases the LEDs begin to conduct lowering the impedance presented to the line circuit and introducing nonlinearity into the circuit. The effect becomes even more pronounced when the varistor begins to conduct during most of a ringing cycle or other ac cycle. As the amplitude of the signal increases the impedance approaches that of the series capacitor and resistor.

To insure that the line circuit does not interfere with line insulation tests and cable pressure monitoring devices, there are no dc current paths from either tip or ring to ground or resistive elements across the line (other than the hold bridge when the circuit is in the HOLD state). The only possible leakage across the line and/or to ground is through the ring up capacitor, or through the optical isolator and hold bridge relay contacts.

Since the ring detector remains on the line in the BUSY state any increase in capacitance decreases the percent break of the dial pulses while any increase in the series resistance of the ring detector increases the percent break. Since the dial pulse voltage amplitude is large as compared to the forward voltage characteristics of the varistor and LED combination, the dominant elements affecting the time constant of the circuit, and consequently the dial pulse percent break characteristics, becomes the series resistance and capacitance which are each high thereby balancing each other and giving an acceptable dial pulse signal.

In the situation of multifrequency signaling the actual signal voltage levels are lower than the signal level which causes the varistor or LED to conduct and thus the circuit presents a linear impedance to the multifrequency signals and does not cause appreciable attenuation.

Accordingly, it is one feature of our invention that a key telephone line circuit is arranged with series capacitance and resistance elements coupled to the line via nonlinear circuit elements in a manner which satisfies the ring test, impedance test and circuit communication requirements while also remaining on the communication path during the active communication condition of the connection.

It is another feature of our invention that a key telephone line circuit is arranged for permanent connection across the communication pair by a combination of linear and nonlinear circuit elements, the combination of elements combining to provide essential transparency to voice and signal communication over the communication pair while also serving to detect circuit status signal information transmitted over the communication pair.

BRIEF DESCRIPTION OF THE DRAWING

The principles of the invention as well as additional objects and features thereof will be more fully appreciated from the illustrative embodiment shown in the single drawing of the line circuit. The drawing shows in schematic diagram form, the circuit elements of the line circuit.

GENERAL DESCRIPTION

The operation of the line circuit shown in the drawing in the key telephone environment will not be undertaken herein. Overall operation of the line circuit and its cooperation with the key telephone stations and with the central switching machine is well known and will not be repeated herein. For an example of such overall operation, see U.S. Pat. No. 3,436,480 issued to R. E. Barbato et al. on Apr. 1, 1969. For an example of shunt operation of a line circuit, see the aforementioned Angner et al patent.

The line circuit shown in the drawing is designed for operation with a control circuit shown as control circuit IC1. The details of the operation of control circuit IC1 are set out in concurrently filed copending application of R. J. Angner et al, Ser. No. 708,857, (Angner 15-1-4) and in the interest of economy will not be repeated herein. The aforementioned Angner, Blount, Lacy application is hereby incorporated herein and made a part thereof as though fully reproduced.

DETAILED DISCUSSION

As discussed, the impedance of the tip-ring interface in the line circuit is both frequency and amplitude dependent and, in general, is nonlinear. Unlike prior line circuits, the disclosed line circuit communication path interface is across the communication line when the line circuit is in the IDLE, RING, and BUSY states; the tip-ring detector is not switched out in the BUSY state as in the past. For low amplitude signals across the line which do not cause varistor 1V1 or LEDs 1D1 and 1D2 in shunt detector 103 to conduct, the total impedance across the line is simply the series impedance of capacitor 1C1 (approximately 1.1μf) and resistors 1R2 (approximately 7.5K ohms), and 1R3 (approximately 3.83K ohms). As the amplitude of the signal applied to the line is increased, the LEDs in opto isolation shunt detector 103 begin to conduct, lowering the impedance presented to the line and introducing nonlinearity into the total load. The effect becomes even more pronounced when varistor 1V1 begins to conduct during part of the ac cycle. As the amplitude of the signal is increased, the impedance approaches that of capacitor 1C1 and resistor 1R2 in series. Varistor 1V1 is a 3 diode drop silicon varistor.

In the IDLE and RING states, the line circuit must present a load to the communication line which appears as a telephone ringer to the switching machine. This is necessary to satisfy the impedance test which is satisfied by a 600 ohm load to an ac signal or a 200 ohm load to a dc signal. In systems with common audible signaling, the line circuit load substitutes for the load for actual ringers across the line. Since a simple series R-C circuit is used to replace the prior art R-L-C network, care was taken to choose the component values to insure that all COs and PBXs will interpret the load correctly under all normal line conditions.

To insure that the line circuit does not interfere with line insulation tests and cable pressure monitoring devices, there are no dc current paths from either tip or ring to ground or resistive elements across the line (other than the hold bridge when the circuit is in the HOLD state).

RINGING CURRENT FLOW TEST

The ringing current flow test is performed by COs and PBXs to test for the presence of a ringer (and therefore a telephone set) on the line during the application of CO ringing. In common audible systems, since the ring detector of the line circuit must pass for a true ringer, the impedance of the ring detector must be low enough to cause sufficient ac loop current to flow to trip a current sensing circuit at the switching machine. This requirement is met since the communication line interface presents to the ringing generator a maximum impedance of 11.3 at an angle of −40.0° kilohms and will therefore source a minimum current of 6.6 milliaperes RMS at 75 volts RMS, 20 Hertz.

LINE STATUS VERIFICATION TEST

The line status verification test is made to check for the presence of a telephone ringer bridged across the line. As explained previously, the ring detector in the line circuit may substitute for a true ringer in some key systems. The test equipment applies a low amplitude ac signal to the line and monitors the current waveform. It will recognize the series R-C termination of a ring detector as a ringer if the effective dynamic resistance of the circuit falls within 6500 to 13000 ohms for values of capacitance greater than 1.05 microfarads. Presently designed equipment applies a signal which may not have sufficient amplitude to cause varistor 1V1 or the LEDs in optical isolator shunt detector 103 to conduct. The effective resistance, then, is resistor 1R2 and 1R3 in series. If the amplitude of the applied signal is increased, causing nonlinear devices 1D1, 1D2 in shunt detector 103 to conduct, resistor 1R3 is shunted causing the dynamic resistance across the communication paths to decrease, but it always remains within the limits specified above.

CO RINGING PRETRIP AND RANGE

If the parallel impedance of all ringers and/or ring detectors bridged across a line is too low, ringing will be prematurely tripped on short loops or there will be insufficient ringing voltage across devices at the end of long loops. To avoid these conditions, limits have been placed on the maximum number of ringers and/or ring detectors that can be bridged across the line. The impedance of the line circuit ring detector is greater than that of a typical telephone ringer at 20 and 30 Hertz, and that the use of the line ring detector does not present a problem in regard to ringing pretrip or range.

DIAL PULSE MUTILATION

Since the ring detector is not disconnected from the line in the BUSY state, it will contribute to dial pulse distortion in much the same way that ringers do. In general, increasing the series capacitance of a ringer or ring detector decreases the percent break of the dial pulses and increasing the series resistance increases the percent break. Typical ringers have a total series resistance of 3650 ohms and require a 0.45 microfarad series capacitor in contrast to the 7500 ohms and the 1.1 microfarads for the disclosed line circuit. The amplitude of the dial pulses is quite large compared to the forward voltage characteristics of varistor 1V1 and the LEDs in shunt detector 103, so that resistor 1R2 and capacitor 1C1 are the dominant elements in the line circuit. Since the higher capacitance and resistance of the ring detector tend to compensate for each other, the bridged ring detector does not cause significantly more dial pulse distortion than does a true ringer.

As an example, consider a case in which the percent break with no ringer or detector is 55.6 percent. The addition of four typical ringers to the line increases the break interval to 62.7 percent, an additional 7.1 percent. Replacing one of the four ringers with the disclosed line circuit ring detector results in a break interval of 63.0 percent, a 0.3 percent difference.

MULTIFREQUENCY DIAL PULSE SIGNALING ATTENUATION

The maximum level per frequency pair for multifrequency signals is +4 dbm, which corresponds to 1.5 volts RMS into 900 ohms, which is below the signal level that will cause varistor 1V1 or the LEDs is shunt detector 103 to conduct significant current, as compared to resistor 1R2. Consequently, the additional load presented to the multifrequency generator is linear and consists of capacitor 1C1 in series with resistors 1R2 and 1R3.

DETECTION OF RINGING SIGNALS

When a periodic signal is applied across the T and R leads, an ac current of the same period flows through the series circuit consisting of capacitor 1C1, resistor 1R2, and the parallel combination of resistor 1R3, varistor 1V1, and LEDs 1D1 and 1D2 in series with resistor 1R4. If the signal is of sufficient amplitude, enough current flow, through the LEDs in the optical isolator to saturate the Darlington phototransistors 1Q1 and 1Q2. The collector of the Darlington pair is connected to V+ and the emitter drives the DIN input to control circuit IC1 through series resistor 1R7. A parallel R-C circuit consisting of resistors 1R12 and 1C5 is connected across the DIN and V- terminals. For true ringing signals, sufficient current flows through the LEDs to keep the output transistor saturated during most of the ac cycle. As the current flowing through capacitor 1C1 reverses polarity, the LED current momentarily drops below the value required to saturate the output transistor. The time constant of the R-C circuit consisting of resistors 1R12 and 1C5 in parallel with the DIN input circuit is long enough to bridge these short inervals. Consequently, when true ringing is applied to the circuit, the voltage at the DIN input never drops below the negative-going threshold (0.8 volts with respect to V−), providing a steady indication of logical 1 to the logic circuitry. The line circuit must be capable of ringing up on as low as 40 volts RMS, 20 or 30 Hertz ringing signals if it is to be compatible with all COs, PBXs, and range extenders on standard, unigauge, and extended loops.

REJECTION OF NONRINGING SIGNALS AND NOISE

The line circuit should not ring up when nonringing signals are present on the line. When a line circuit is in the IDLE and RING states, it may be exposed to any of the following types of signals or noise: (1) dial pulsing generated by a station without A-lead control; (2) TOUCH-TONE signals generated by stations without A-lead control; (3) CO battery interruptions or reversals (4) hum pick-up from power lines and other sources of 60 Hertz radiation; and (5) crosstalk from other wires in telephone cables. Two characteristics of the line circuit control immunity to the above types of signals and noise: (1) the sensitivity of the shunt detector determines the signal amplitude, waveform, and frequency required to generate a continuous logical 1 at the DIN input; (2) ring-up delay timing in the IDLE and RING states requires a continuous logical 1 at the DIN input for at least 170 milliseconds to generate a transition from the IDLE to RING state; and once in the RING state, DIN must remain high for at least 110 milliseconds to reset the ring time-out timer. For maximum length standard, unigauge, and extended loops, the line circuit will not ring up in response to dial pulsing, battery interruptions, or battery reversals. The maximum level per frequency pair for a multifrequency signal is +4 dbm, which corresponds to 1.5 volts RMS into 900 ohms, which is well below the signal level required to cause the line circuit to ring up.

TRANSIENT DETECTION

When off-hook and on-hook transitions are made, voltage transients are generated across the line in response to the telset network being connected across and disconnected from the line. These transients must be detected to insure correct state transitions in the logic. Failure to detect the on-hook transition is most serious because false hold will result.

Referring again to the line detector circuit shown in the drawing, observe that under steady-state line conditions, capacitor 1C1 charges to the average dc voltage across the line. Should the volage across the line change for any reason, current flows through shunt detector 103, charging capacitor 1C1 to the new line voltage. If the voltage change is large enough and fast enough, the charging current generates a voltage drop across the LEDs in shunt detector 103 of sufficient amplitude to cause them to conduct enough current to turn phototransistors 1Q1 and 1Q2 on, thus generating a pulse at the DIN output. Note that antiparallel LEDs 1D1 and 1D2 allow detection of positive-going and negative-going transitions with either polarity of the battery supply.

The shunt line detector has been designed to generate a pulse of at least 1.0 milliseconds in response to a 6.0 volt step change in voltage across the line. This high a sensitivity is more than adequate for standard, unigauge, and extended loop lengths of zero to maximum length where the only additional devices bridged across the line are ringers and/or key telephone line circuits. The minimum sensitivity of the shunt detector has been set at 6.0 volts in order to respond correctly to switchhook flashes when operating in conjunction with PBXs.

HOLD BRIDGE CURRENT DETECTION

When the line circuit is in the HOLD state, relay H is energized completing a path for loop current to flow through hold bridge resistor 1R1 (120 ohms) via enabled make contact H-1, and the parallel combination of resistor 1R3, varistor 1V1, and LEDs 1D1 and 1D2 in shunt detector 103 in series with resistor 1R4. Most of the hold bridge current flows through varistor 1V1 (equivalent to 3 diode drops in either direction) which limits the maximum current that flows through the LEDs in the optical isolator shunt detector. Resistor 1R4 permits 1 to 5 milliamperes to flow through the LEDs when the circuit is in the HOLD state. The phototransistor is saturated, providing a steady logical 1 indication at the DIN input. If CO battery is interrupted, the hold bridge current drops to zero, the LEDs stop conducting, and the DIN input to control circuit Ic1 goes to logical 0. The minimum hold bridge current which will cause the voltage at the DIN input to go high can range from 0.25 to 0.60 milliamperes, largely because of variations in the current transfer ratio of shunt detector 103.

What is claimed is:

1. A line circuit for use in controlling communication services between a telephone switching machine and a telephone station, said switching machine performing a pre-ring test, an impedance test and a line status verification test, said line circuit adapted for continuous connection in parallel across the communication conduction pair between said switching machine and said telephone station and adapted for A-lead control from said station, said line circuit including means for detecting both transient signals and ringing signals on said conduction pair, said transient signals being generated by the on-hook to off-hook or off-hook to on-hook transition of said station, and said ringing signals being applied to said communication conduction pair from said switching machine, said transient signal detecting means comprising linear and nonlinear circuit elements, said linear circuit element including a capacitor and resistor series circuit across said communication pair and said nonlinear circuit element including a light emitting diode pair and a varistor parallel circuit across said resistor portion of said linear circuit element.

2. The invention set forth in claim 1 wherein said resistive portion of said linear circuit element includes two separate resistive elements and wherein said nonlinear circuit element is connected in parallel with a first one of said resistive circuit elements.

3. The invention set forth in claim 2 wherein said detecting means has a maximum impedance such that a 75 volt RMS, 20 Hz signal applied through a total series resistance of 2910 ohms and with a 0.145μf shunt load across the said transient signal detecting means produces a current flow of at least 5.9 ma RMS, and a minimum impedance of 8000 ohms between 20 and 30 Hz.

4. The invention set forth in claim 3 wherein said detecting means provides an output signal in response to transient signal having at least a 6 volt step change.

5. The invention set forth in claim 2 wherein said linear circuit element has a capacitance value between 1.045 and 1.155 microfarads and a resistance value between 11.10K ohms and 11.56K ohms for line signal amplitudes less than 1.5 volts RMS.

6. The invention set forth in claim 5 wherein said nonlinear circuit element light emitting diode pair does not conduct under 1.5 volts peak-to-peak and said varistor circuit element does not conduct under 3.5 volts peak-to-peak.

7. The invention set forth in claim 2 further comprising impedance means, separate from said detecting means, operable for connection in combination with a portion of said detection means across said communication pair for holding said communication pair active when said station is in the hold mode, and means responsive to detected transient signals and other signals over said A-lead from said station for enabling said impedance hold means.

8. The invention set forth in claim 7 wherein said impedance hold means is a resistive element connectable in parallel across the series combination of said capacitor and a second one of said resistive circuit elements.

9. The invention set forth in claim 8 wherein said detecting means is arranged for detecting holding current flowing from said switching machine during said enabling of said impedance hold means.

* * * * *